United States Patent
Okamoto et al.

(10) Patent No.: US 10,148,844 B2
(45) Date of Patent: Dec. 4, 2018

(54) IMAGING APPARATUS

(71) Applicant: Panasonic Intellectual Property Management Co., Ltd., Osaka (JP)

(72) Inventors: Mitsuyoshi Okamoto, Osaka (JP); Tomohiro Oogami, Nara (JP); Kohei Fukugawa, Osaka (JP); Koji Takayama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/342,484

(22) Filed: Nov. 3, 2016

(65) Prior Publication Data

US 2017/0264773 A1    Sep. 14, 2017

(30) Foreign Application Priority Data

Mar. 10, 2016    (JP) .................. 2016-047232

(51) Int. Cl.
| | |
|---|---|
| *H04N 5/85* | (2006.01) |
| *H04N 1/21* | (2006.01) |
| *H04N 5/232* | (2006.01) |
| *G02B 7/04* | (2006.01) |
| *H04N 5/77* | (2006.01) |
| *H04N 5/907* | (2006.01) |
| *H04N 9/804* | (2006.01) |
| *G02B 7/36* | (2006.01) |
| *G03B 13/36* | (2006.01) |

(52) U.S. Cl.
CPC .............. *H04N 1/212* (2013.01); *G02B 7/04* (2013.01); *G02B 7/365* (2013.01); *G03B 13/36* (2013.01); *H04N 1/2125* (2013.01); *H04N 5/23245* (2013.01); *H04N 5/23293* (2013.01); *H04N 5/772* (2013.01); *H04N 5/907* (2013.01); *H04N 9/8042* (2013.01)

(58) Field of Classification Search
None
See application file for complete search history.

(56) References Cited

U.S. PATENT DOCUMENTS

| | | | |
|---|---|---|---|
| 2015/0109479 A1* | 4/2015 | Kimoto | H04N 5/23212 348/231.99 |
| 2016/0021298 A1* | 1/2016 | Tsutsumi | G06T 7/593 348/349 |

FOREIGN PATENT DOCUMENTS

JP    5866674    1/2016

* cited by examiner

*Primary Examiner* — Eileen M Adams
(74) *Attorney, Agent, or Firm* — Wenderoth, Lind & Ponack, L.L.P

(57) ABSTRACT

An imaging apparatus includes an optical system, an imaging unit that captures a subject image which is input via the optical system and generates an image signal, an image processor that performs predetermined processing on the image signal generated by the imaging unit and generates image data, a display unit that displays an image represented by the image data, and a control unit that controls the image processor and the display unit. The control unit records moving image data and generates, from all or a part of a plurality of frame images composing recorded moving image data, a still image based on user's specifying of an image or an area of the image. The display unit displays one frame image among the plurality of frame images composing the recorded moving image data, as a setting image for the user to specify an image or an area of the image, and adds highlighting to an in-focus portion in the setting image.

9 Claims, 16 Drawing Sheets

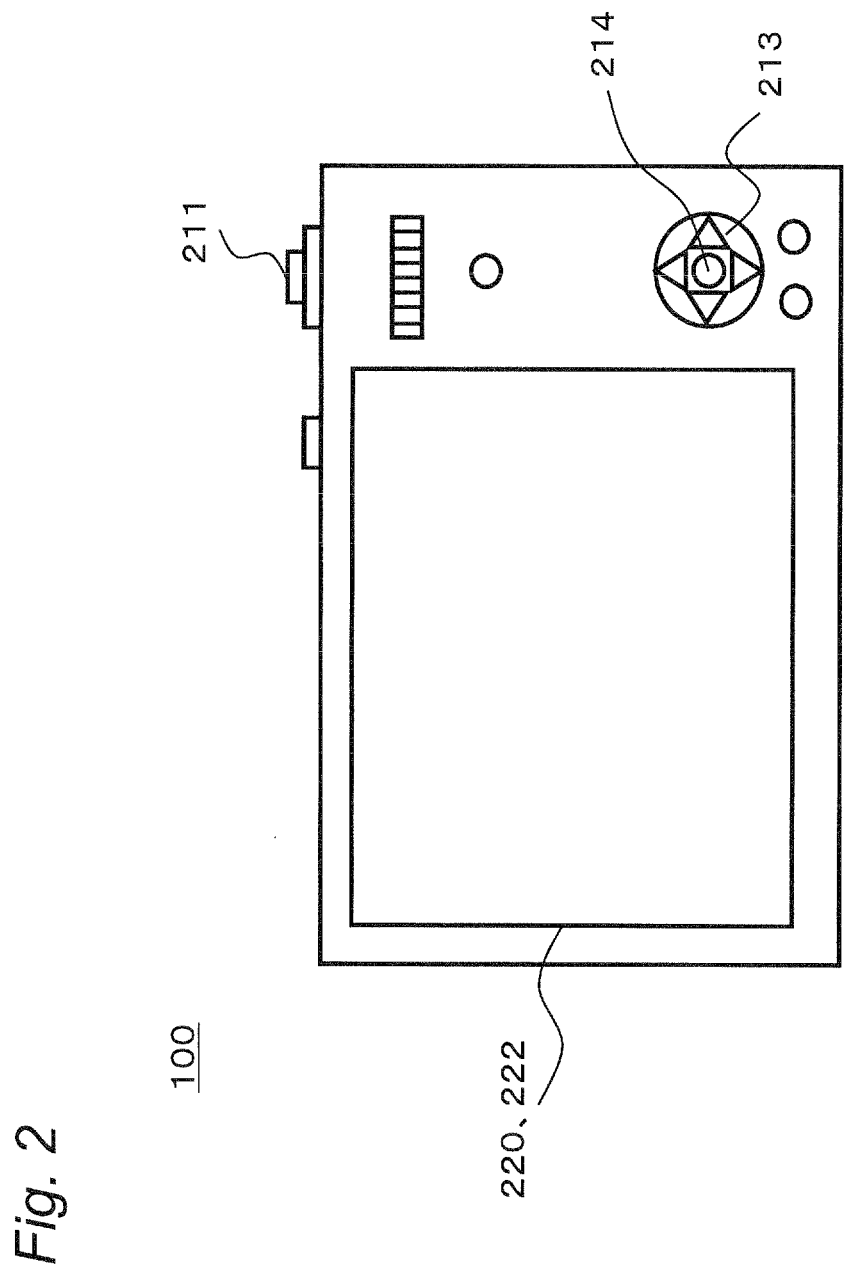

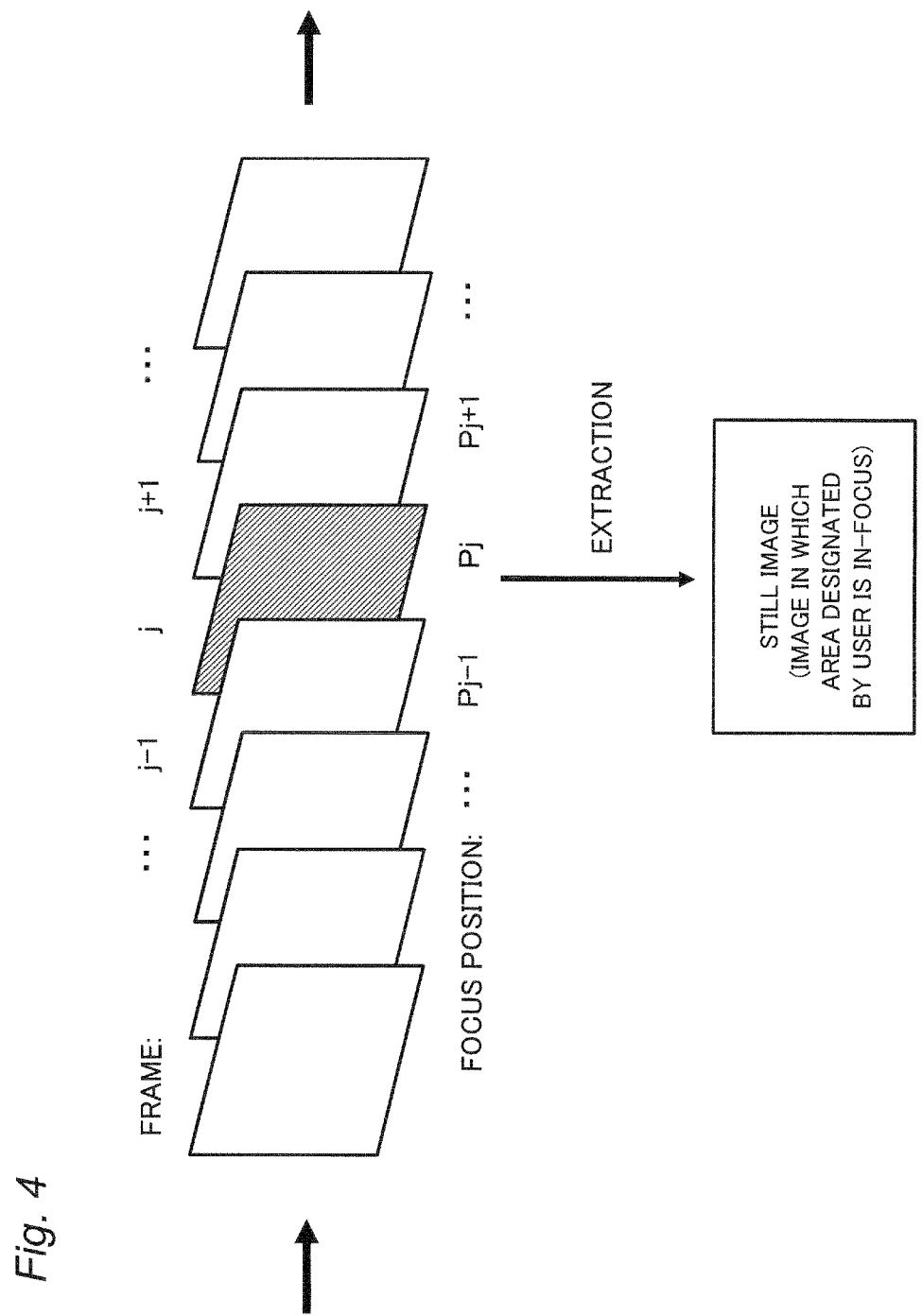

Fig. 6A

FOCUS INFORMATION TABLE

| | FOCUS LENS POSITION (CLOSEST TO NEAREST END) (Pnear) | FOCUS LENS POSITION (CLOSEST TO INFINITY END) (Pfar) |
|---|---|---|
| a | 10 | 200 |

↙ 60

| | | 1ST AF AREA | 2ND AF AREA | 3RD AF AREA | ... | 19TH AF AREA | ... | 49TH AF AREA |
|---|---|---|---|---|---|---|---|---|
| b | FRAME NUMBER OF IN-FOCUS FRAME | 5 | 43 | 36 | ... | 50 | ... | 100 |
| c | FOCUS LENS POSITION (FOCUS POSITION) | 10 | 100 | 75 | ... | P | ... | 200 |

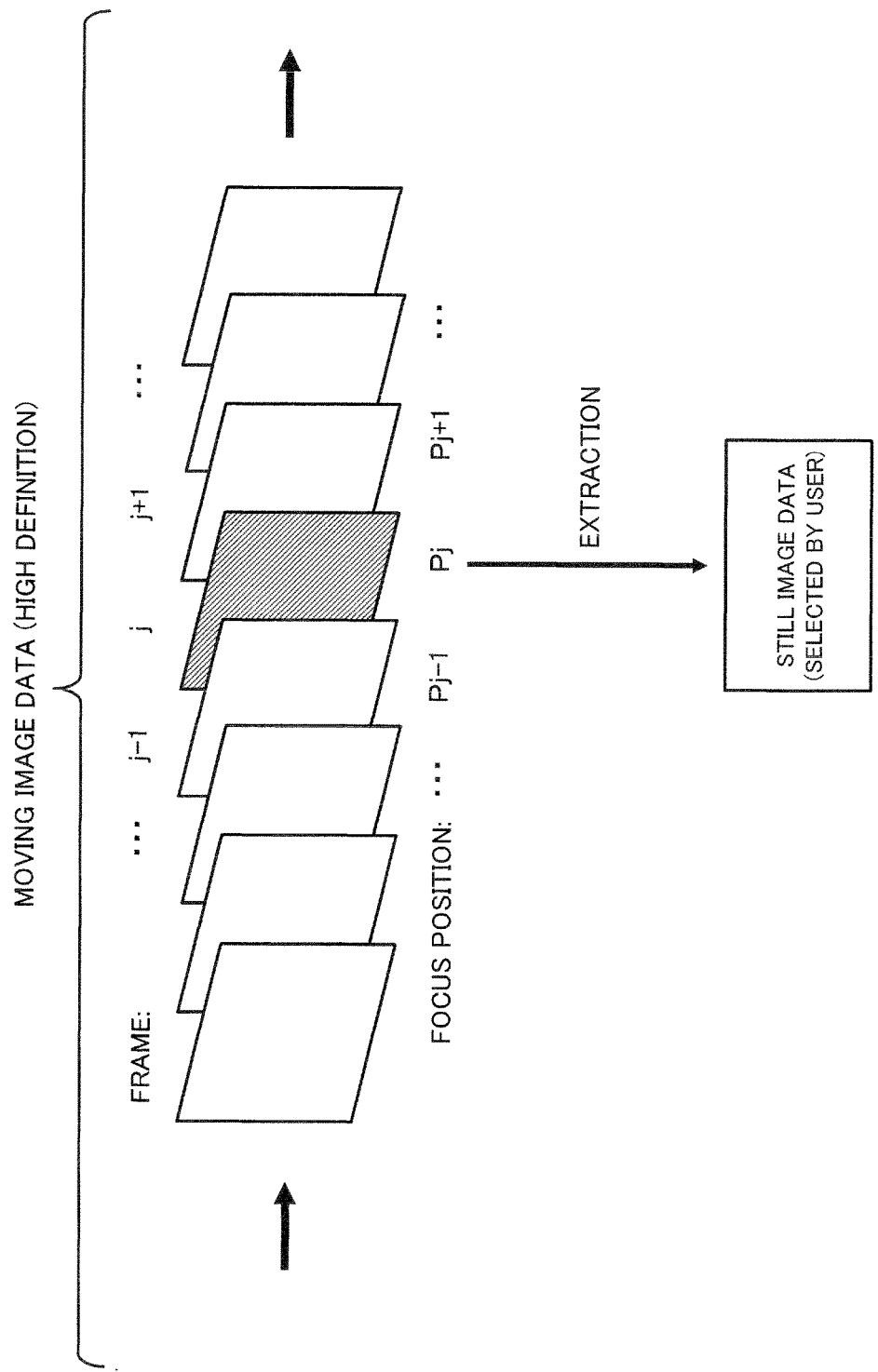

FOCUS INFORMATION TABLE

| FRAME NO. | 1 | 2 | 3 | ... | ... | 9,000 |
|---|---|---|---|---|---|---|
| IN-FOCUS AF AREA NUMBER | 18 | 19 | 18 | ... | ... | 28 |

IMAGING APPARATUS

BACKGROUND

1. Technical Field

The present disclosure relates to an imaging apparatus that generates a still image from moving image data based on specification by the user.

2. Related Art

Japanese Patent Publication No. 5866674 discloses an imaging apparatus including an imaging unit that generates image data from optical information which is input via an optical system unit, an image processor that performs predetermined processing on the image data generated by the imaging unit, and a controller that controls the imaging unit and the image processor based on setting for moving image shooting to generate moving image data. In this imaging apparatus, the controller has a first moving image mode and a second moving image mode as recording modes of a moving image. In the second moving image mode, the controller automatically sets setting for moving image shooting to predetermined setting suitable for still image recording. That is, since the imaging apparatus in Japanese Patent Publication No. 5866674 records a moving image in the setting (a recording mode) suitable for a still image, a high image quality still image can be obtained from the recorded moving image.

In the case of extracting a still image from a recorded moving image as performed by the imaging apparatus disclosed in Japanese Patent Publication No. 5866674, the user needs to specify an image to be extracted.

The present disclosure provides an imaging apparatus that generates (extracts) still image data from moving image data based on user's specification, improving user's convenience in user's specifying.

SUMMARY

In one aspect of the present disclosure, an imaging apparatus is provided. The imaging apparatus includes an optical system, an imaging unit that captures a subject image which is input via the optical system and generates an image signal, an image processor that performs predetermined processing on the image signal generated by the imaging unit and generates image data, a display unit that displays an image represented by the image data, and a control unit that controls the image processor and the display unit. The control unit records moving image data and generates, from all or a part of a plurality of frame images composing recorded moving image data, a still image based on user's specifying of an image or an area of the image. The display unit displays one frame image among the plurality of frame images composing the recorded moving image data, as a setting image for the user to specify an image or an area of the image, and adds highlighting to an in-focus portion in the setting image.

The imaging apparatus of the present disclosure adds highlighting to an in-focus portion in a setting image for the user to specify an image or an area of an image. Accordingly, the user can easily understand the in-focus portion in the image. Therefore, the imaging apparatus improves user's convenience when selecting a desired image or a desired area of an image based on an in-focus state.

BRIEF DESCRIPTION OF DRAWINGS

FIG. 2 is a back view of the digital camera;

FIG. 4 is an explanatory view of extraction of a still image from moving image data;

FIG. 6A is a view showing an example of a focus information table.

FIG. 11 is an explanatory view of generating a still image by extracting one frame image from high image quality moving image data;

DETAIL DESCRIPTION OF PREFERRED EMBODIMENTS

Figure 1:
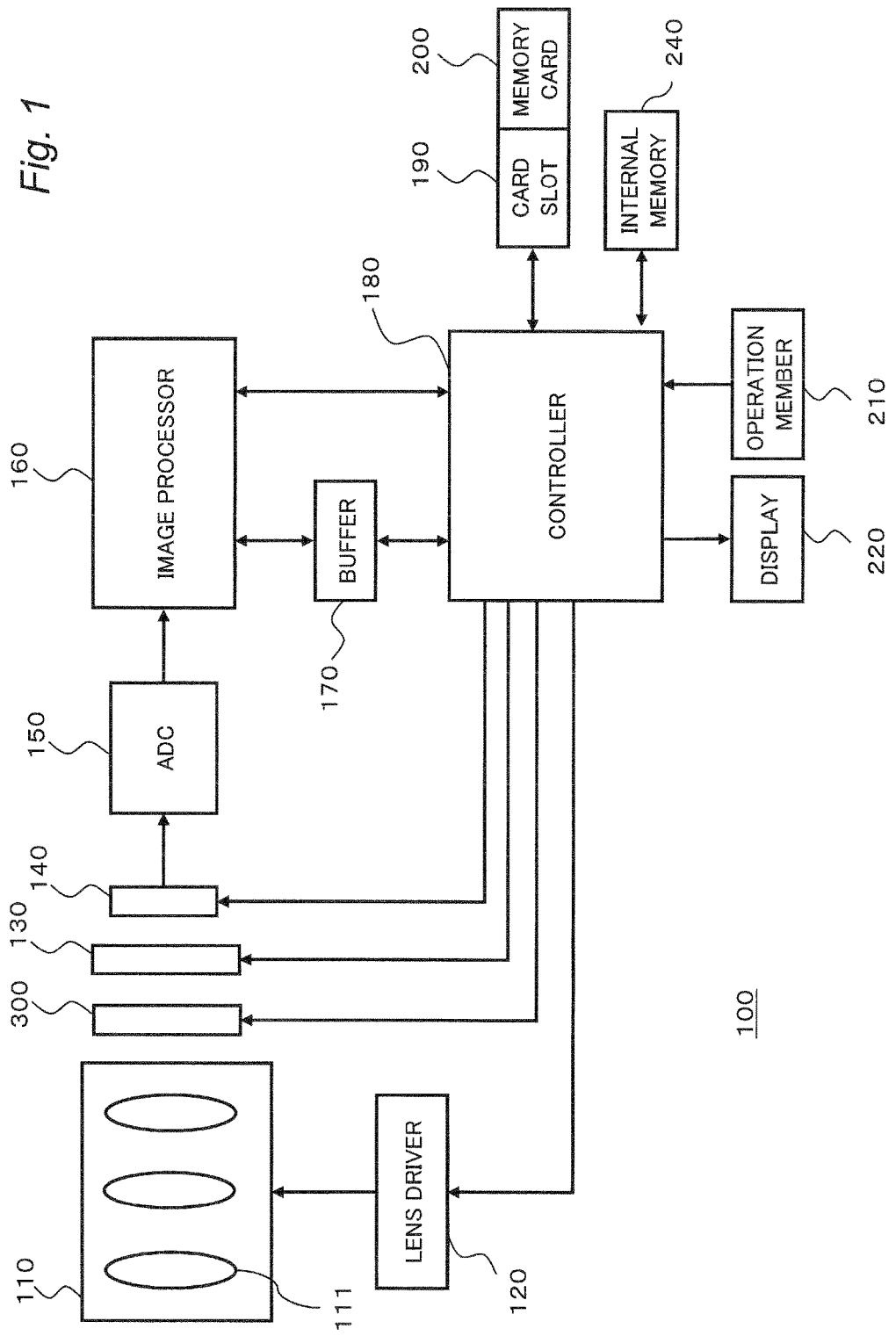
FIG. 1 is a diagram showing a configuration of a digital camera according to the present disclosure.

Hereinafter, a preferred embodiment will be described in detail by appropriately referring to the drawings. However, a more than necessary detailed description will be omitted in some cases. For example, a detailed description of an already-known item and a duplicate description of substantially identical configurations will be omitted in some cases. This is for the purpose of facilitating the understanding of those skilled in the art concerned, by avoiding the following description becoming unnecessarily redundant. The present inventors provide the appended drawings and the following description for those skilled in the art concerned to sufficiently understand the present disclosure, and will not intend to limit, by the provision, the subject of the description in claims.

Hereinafter, an imaging apparatus according to an embodiment of the present disclosure will be described with reference to the drawings.

First Embodiment

1. Configuration of Digital Camera

An electrical configuration of a digital camera according to a first embodiment will be described with reference to FIG. 1. FIG. 1 is a block diagram showing a configuration of a digital camera 100. The digital camera 100 is an imaging apparatus that captures, with a CCD 140, a subject image formed by an optical system 110 composed of one or a plurality of lenses. The image data generated by the CCD 140 is processed by an image processor 160 and stored in a memory card 200. A configuration of the digital camera 100 will be described below in detail.

The optical system 110 includes a zoom lens and a focus lens 111. A subject image can be zoomed in or zoomed out by moving the zoom lens 112 along an optical axis. A focus (an in-focus state) of the subject image can be regulated by moving the focus lens 111 along the optical axis.

A lens driver 120 drives various kinds of lenses included in the optical system 110. The lens driver 120 includes, for example, a zoom motor for driving the zoom lens and a focus motor for driving the focus lens 111.

A diaphragm 300 regulates a size of an opening according to user's setting or automatically to adjust a quantity of light transmitting through the opening.

A shutter 130 is a unit that blocks light transmitting to the CCD 140. The shutter 130 together with the optical system 110 and the diaphragm 300 composes an optical system unit that controls optical information indicating a subject image. Further, the optical system 110 and the diaphragm 300 are housed in a lens barrel (not shown).

The CCD 140 captures a subject image formed by the optical system 110 to generate image data. The CCD 140 includes a color filter, a light-receiving element, and an AGC (Auto Gain Controller). The light-receiving element converts an optical signal collected by the optical system 110 into an electric signal to generate image information. An AGC amplifies the electric signal output from the light-receiving element.

An ADC (A/D(analog/digital) converter) 150 converts analog image data generated by the CCD 140 to digital image data.

The image processor 160 performs various kinds of processing to digital image data generated by the CCD 140 and converted by the ADC 150, under control of a controller 180. The image processor 160 generates image data for displaying on a display monitor 220, and also generates image data to be stored in the memory card 200. For example, the image processor 160 performs various kinds of processing such as gamma correction, white balance correction, and flaw correction, to the image data generated by the CCD 140. Further, the image processor 160 compresses the image data generated by the CCD 140 according to a compression format according to H.264 standard or MPEG2 standard. Further, the image processor 160 can generate image data (4k moving image data) of a moving image of around 4000×2000 pixels, based on the image data generated by the CCD 140. The image processor 160 can perform various kinds of processing described later to the generated 4k moving image data.

The controller 180 is a control unit that controls the entire digital camera 100. The controller 180 can be realized by a semiconductor element or the like. The image processor 160 and the controller 180 may be configured by only hardware, or combination of hardware and software. That is, the controller 180 can be realized by microcomputer, CPU, MPU, DSP, ASIC, FPGA, or the like.

A buffer 170 functions as a work memory for the image processor 160 and for the controller 180. The buffer 170 can be realized by, for example, a DRAM (Dynamic Random Access Memory), a ferroelectric memory, or the like.

A card slot 190 is a unit for attaching the memory card 200 to the digital camera 100. The card slot 190 can mechanically and electrically connect the memory card 200 to the digital camera 100.

The memory card 200 internally includes a flash memory, a ferroelectric memory, and the like, and can store data such as an image file generated by the image processor 160.

An internal memory 240 is configured by a flash memory, a ferroelectric memory, or the like. The internal memory 240 stores a control program for controlling the entire digital camera 100, data, and so on.

An operation member 210 is a collective term of a user interface that receives an operation by the user. The operation member 210 includes a button, a lever, a dial, a touch panel, and a switch that receives user's operation. Further, the operation member 210 includes a focus ring provided on an outer periphery of the lens barrel. The focus ring is a member that is rotated by the user to move the focus lens 111.

The display monitor 220 can display an image (a through image) represented by the image data generated by the CCD 140, and an image represented by the image data read from the memory card 200. Further, the display monitor 220 can also display various kinds of menu screens for carrying out various kinds of setting of the digital camera 100. The display monitor 220 can be configured by a liquid-crystal display device or an organic EL display device.

FIG. 2 is a diagram showing a back surface of the digital camera 100. FIG. 2 shows a release button 211, selection buttons 213, a SET button 214, and a touch panel 222, as an example of the operation member 210. The operation member 210 receives an operation by the user to send various kinds of instruction signals to the controller 180.

The release button 211 is a two-step press type press button. When the release button 211 is half pressed by the user, the controller 180 performs autofocus control (AF control), auto-exposure control (AE control), or the like. When the release button 211 is fully pressed by the user, the controller 180 records, as a recorded image, image data of an image captured at a timing of fully pressing, into the memory card 200 or the like.

The selection buttons 213 are press-type buttons provided in vertical and lateral directions. By pressing any one of the selection buttons 213 in the vertical and lateral directions, the user can move the cursor and select various kinds of condition items displayed on the display monitor 220.

The SET button 214 is a press-type button. When the user presses the SET button 214 when the digital camera 100 is in a shooting mode or a playback mode, the controller 180 displays a menu screen on the display monitor 220. The menu screen is a screen for setting various kinds of conditions for shooting/playback. When the SET button 214 is pressed while one or more setting items of various kinds of conditions is/are selected, the controller 180 fixes the setting of the selected setting item(s).

The touch panel 222 is disposed in superposition with a display screen of the display monitor 220 to detect a touch operation of a user finger on the display screen. With the touch panel 222, the user can perform an operation such as specifying an area of an image displayed on the display monitor 220.

2. Operation 2.1 Focus Selection Function

The digital camera 100 according to the present embodiment has a focus selection function for recording one image which is selected by the user from among images of a plurality of frame images which are simultaneously shot with mutually different focus positions (focus lens positions). This function enables the user to select a focus position after the shooting of image. ON (active)/OFF (inactive) of the focus selection function can be set on a menu by user's operation.

According to the focus selection function, a moving image is shot (captured) one image selected by the user is recorded from among images of a plurality of frames composing the shot moving image recorded by changing a focus position. In the focus selection function, for example, a high resolution 4K moving image with around 4000×2000 pixels is recorded. One frame image selected based on specification by the user is extracted from the 4K moving image to obtain a still image. Since the still image obtained in this way is extracted from the 4K moving image, the still image has high image quality.

Figure 3C:
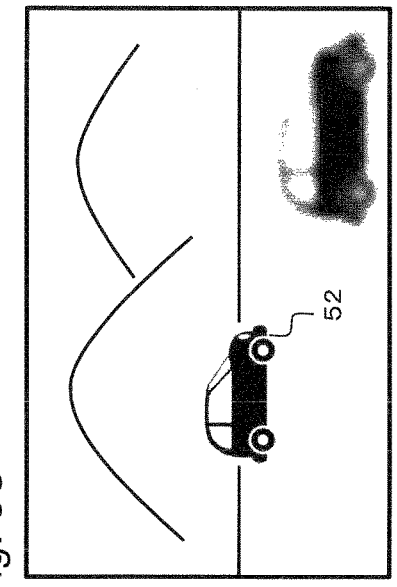
FIG. 3C is an explanatory view of an image focus on a subject (area) specified by a user.
Figure 3A:
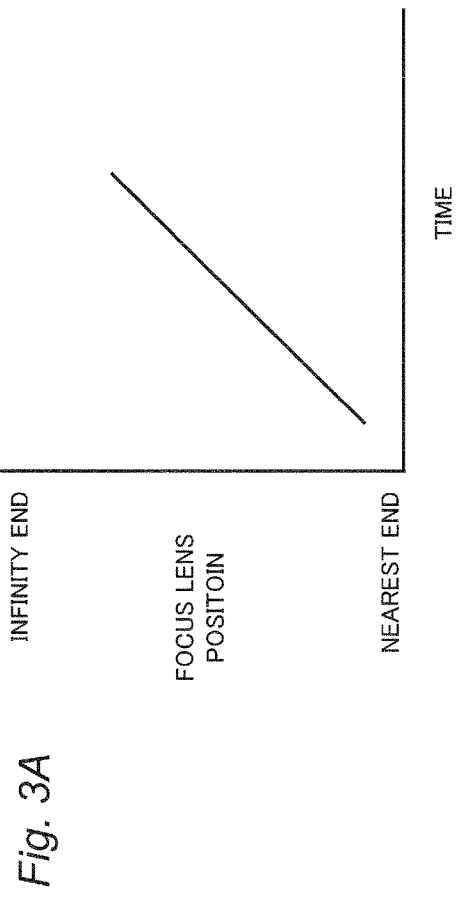
FIG. 3A is an explanatory view of movement of a focus lens in a focus selection function.
Figure 3B:
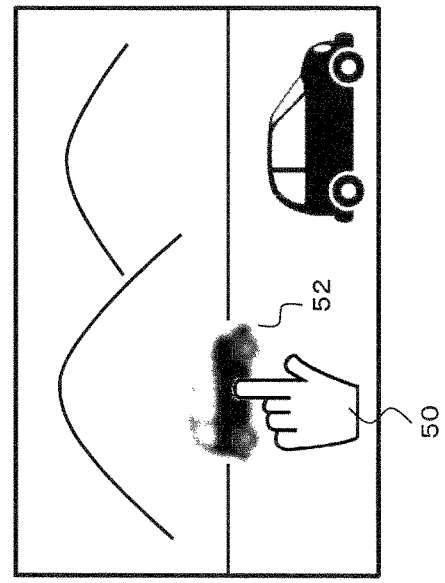
FIG. 3B is an explanatory view of user's specifying of a focus area in a display image.

Specifically, in the focus selection function, recording of moving image is carried out while moving the focus lens 111 from a nearest end side toward an infinity end side (and conversely), that is, while changing a focus position, as shown in FIG. 3A. Thereafter, as shown in FIG. 3B, a user 50 specifies a subject 52 (that is, an area) that user wants to focus on in the shot image, by touching operation. As shown in FIG. 4, the digital camera 100 selects and extracts one frame image based on specification by the user, from among a plurality of frame images composing the moving image, and records the extracted frame image as a still image. Accordingly, a high image-quality still image which is focused on a subject (an area) specified by the user can be obtained, as shown in FIG. 3C.

Figure 5B:
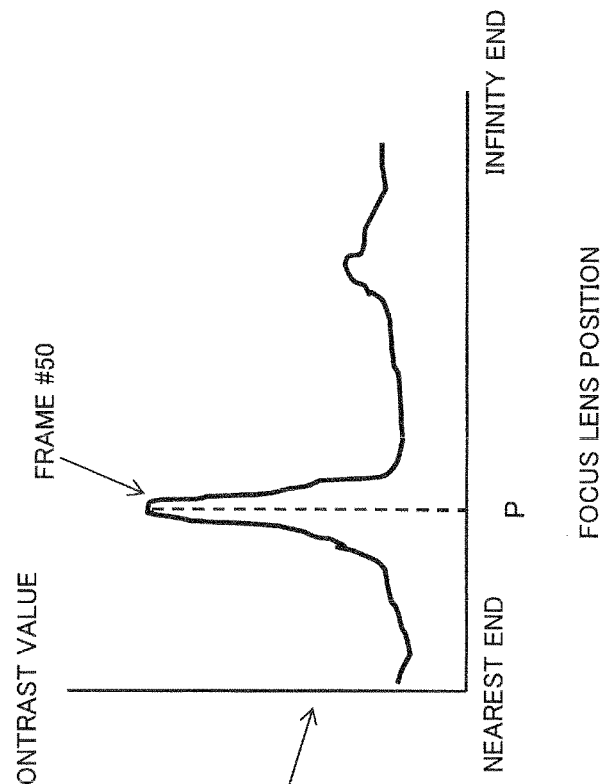
FIG. 5B is an explanatory view of a change in a contrast value in one AF area.
Figure 5A:
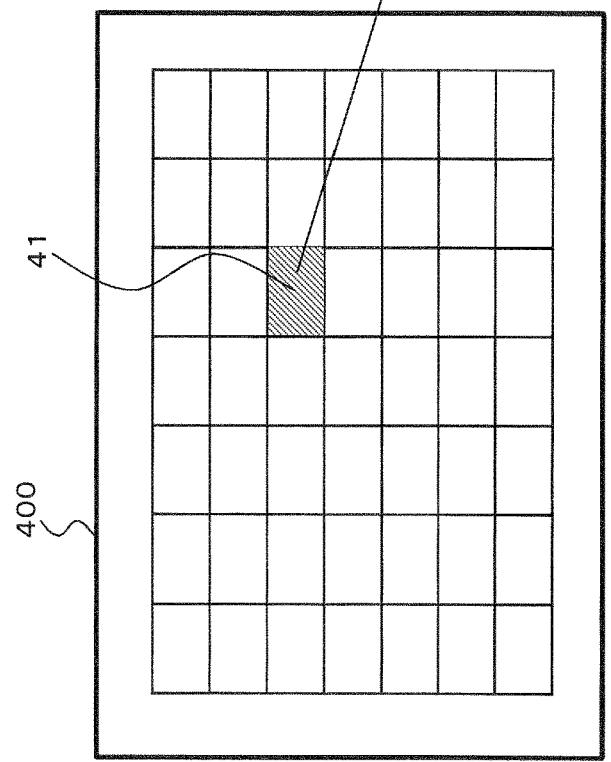
FIG. 5A is an explanatory view of an AF area that is set in an image region.

In the digital camera 100 according to the present embodiment, for an autofocus operation, a plurality (7 rows×7 columns=49) of AF areas as shown in FIG. 5A are set in an image region 400. Then, for each AF area, a frame (hereinafter, referred to as "in-focus frame") that is focused on the AF area is obtained from among a plurality of frames composing the moving image. Information regarding the obtained in-focus frame is recorded in a focus information table. The digital camera 100 performs a focus search operation to generate a part of the focus information table, before recording (shooting) a moving image in the focus selection operation. The remaining information of the focus information table is generated in an operation of a moving image recording after the focus search operation.

FIG. 6A is a diagram showing a data structure of the focus information table. The focus information table 60 contains a focus lens position (Pnear) which is an in-focus lens position closest to a nearest end, and a focus lens position (Pfar) which is an in-focus lens position closest to an infinity end (refer to "a" of FIG. 6A). Further, the focus information table 60 stores, in each AF area, a frame number of a frame focused in each AF area, and a focus lens position at which the corresponding AF area is focused (refer to "b" and "c" of FIG. 6A).

For example, in the focus search operation, a contrast value is obtained in each AF area while moving the focus lens 111. At this time, for example, regarding an AF area 41 shown in FIG. 5A, when a peak of a contrast value is detected at a focus lens position P as shown in FIG. 5B, the focus lens position P is recorded in the focus information table 60 (refer to "c" of FIG. 6A). Then, in the moving image recording operation, a frame number ("50", in this example) of a frame shot at the focus lens position P is recorded in the focus information table 60, related to a position ("P" in this example) of the focus lens 111 (refer to "b" of FIG. 6A). The focus information table 60 is stored in a header of the moving image data which is obtained by moving image recording, for example.

Figure 7:
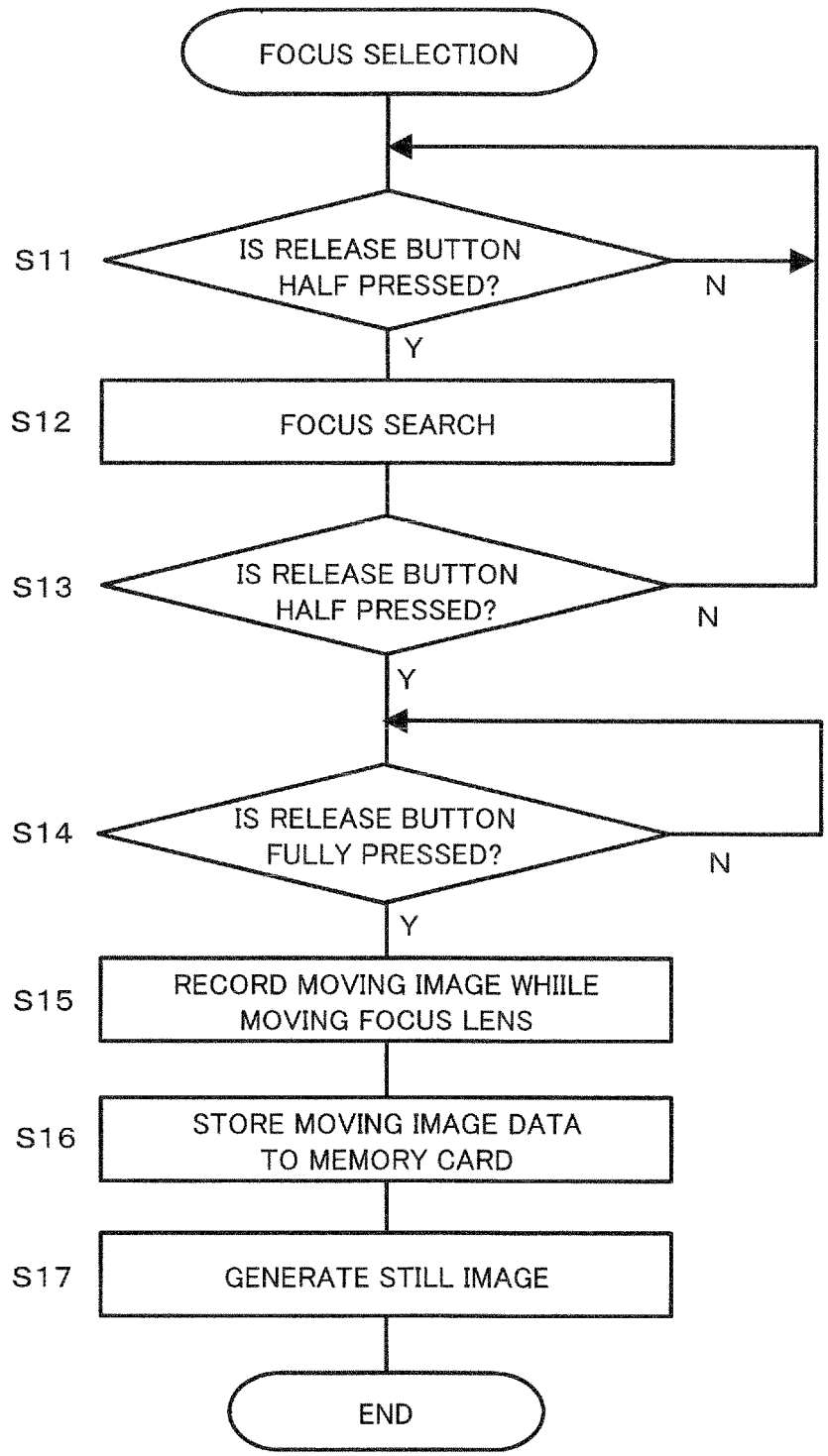
FIG. 7 is a flowchart showing a focus selection operation.

The focus selection operation of the digital camera 100 will be described with reference to a flowchart of FIG. 7.

When the release button 211 is half pressed by a user (YES in S11) in a state that the focus selection function is set active in advance in the digital camera 100, the controller 180 performs the focus search for creating the focus information table 60 by detecting a focus position in each AF area of an image (S12).

In the focus search, the controller 180 detects a contrast value for each AF area while moving the focus lens 111 from a near end to an infinite end (and, conversely) (refer to FIGS. 5A and 5B).

Then, the controller 180 generates the focus information table 60 based on the detected contrast values. Specifically, the controller 180 records, for each AF area, in the focus information table 60 (refer to "c" in FIG. 6A), a position of the focus lens 111 at which a contrast value becomes the largest among a plurality of images shot when the focus lens 111 is moved from the near end to the infinite end (refer to FIG. 5B). Further, in one region, when all contrast values of all images are lower than a predetermined threshold value, it is determined that an in-focus frame (that is, a focus position) is not decided in the one region. Then, a predetermined value indicating that a focus position is unknown in this region is recorded in the focus information table 60. While performing the focus search, a live view image is displayed on the display monitor 220. In this case, highlighting may be applied to an in-focus area of the image to make the user recognize the in-focus area. A detail of the highlighting will be described later. The highlighting enables the user to easily understand an in-focus area in the image. The user can confirm whether an intended region is included in the image and redo the focus search, thus preventing the user from missing a shot (S13).

After searching a whole range, the controller 180 further records in the focus information table 60 a focus position closest to the near end (Pnear) and a focus position closest to the infinity end (Pfar), among focus positions obtained when the focus lens 111 is moved from the near end to the infinity end (refer to "a" in FIG. 6A). Accordingly, the focus search ends. In this state, the frame number of in-focus frame is not included in the focus information table 60 yet.

Thereafter, when the user performs a full-press operation of the release button 211 (YES in S14), an image shooting operation for recording a moving image is started.

Figure 6B:
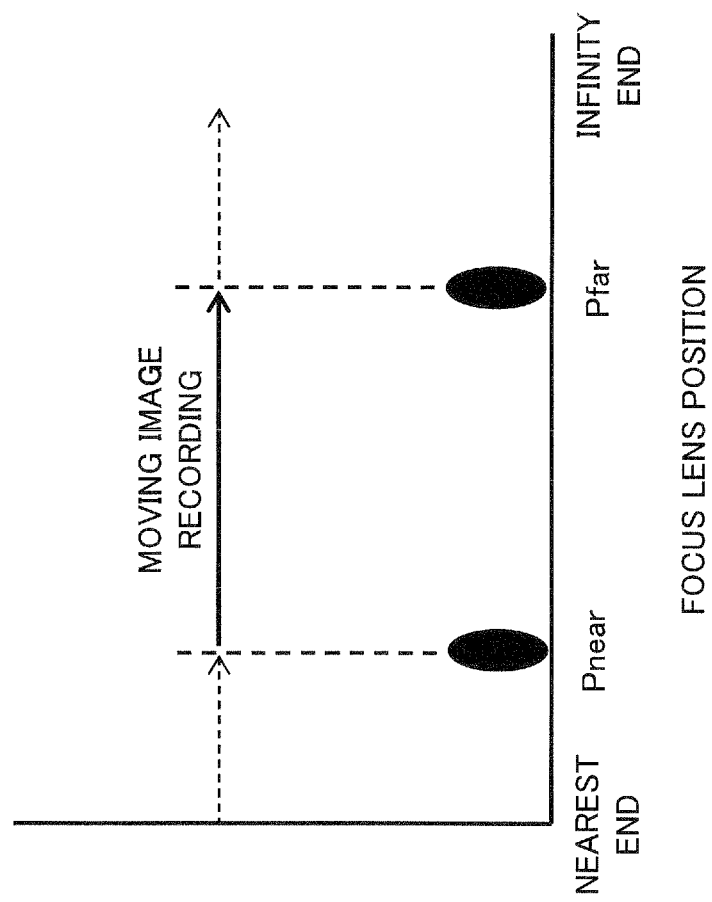
FIG. 6B is an explanatory view of a moving range of the focus lens at a moving image recording time.

That is, the controller 180 returns the focus lens 111 to the near end side, and performs moving image recording while moving the focus lens 111 in a predetermined range (S15). In this case, the predetermined range is a range from the focus position (Pnear) of the focus lens 111 closest to the near end to the focus position (Pfar) of the focus lens 111 closest to the infinity end, as shown in FIG. 6B. The controller 180 decides the predetermined range by referring to the focus information table 60. By limiting the moving range of the focus lens 111 to such a range, moving image recording in the range in which in-focus state cannot be obtained is not performed, so that time taken for moving image recording can be reduced. The moving image recording is performed according to a predetermined format for the moving image data. For example, a moving image is recorded according to the MP4 standard (H.264/MPEG-4 AVC system).

During the moving image recording, an image being recorded is displayed on the display monitor 220. In that time, highlighting may be applied to an in-focus area of the image to allow the user to recognize the in-focus area. A detail of the highlighting will be described later. The highlighting allows the user to easily understand an in-focus area in the image.

Further, during the moving image recording, the controller 180 associates the position of the focus lens 111 with the frame number of each of frames composing the moving image, for each AF area. Specifically, for each AF area, a frame number of a frame shot at the lens position indicated by the focus lens position (refer to "c" of FIG. 6A) of the focus information table 60 is obtained. The obtained focus number is associated with the focus lens position and is recorded in the focus information table 60. Hence, in the focus information table 60, the focus number is associated with each AF area (refer to "b" of FIG. 6A).

Referring back to FIG. 7, when the moving image recording ends (S15), the moving image data having the focus information table 60 recorded in the header is recorded in the memory card 200 (S16). In this way, the image shooting operation ends.

After the image shooting operation, processing of generating a still image is performed according to user's instruction (S17). Specifically, a still image focused on a subject or a region of an image which is specified by the user is generated (extracted) from a moving image recorded in the image shooting operation. Hereinafter, the still image generation operation will be described.

2.1.1 Still Image Generation

Figure 8:
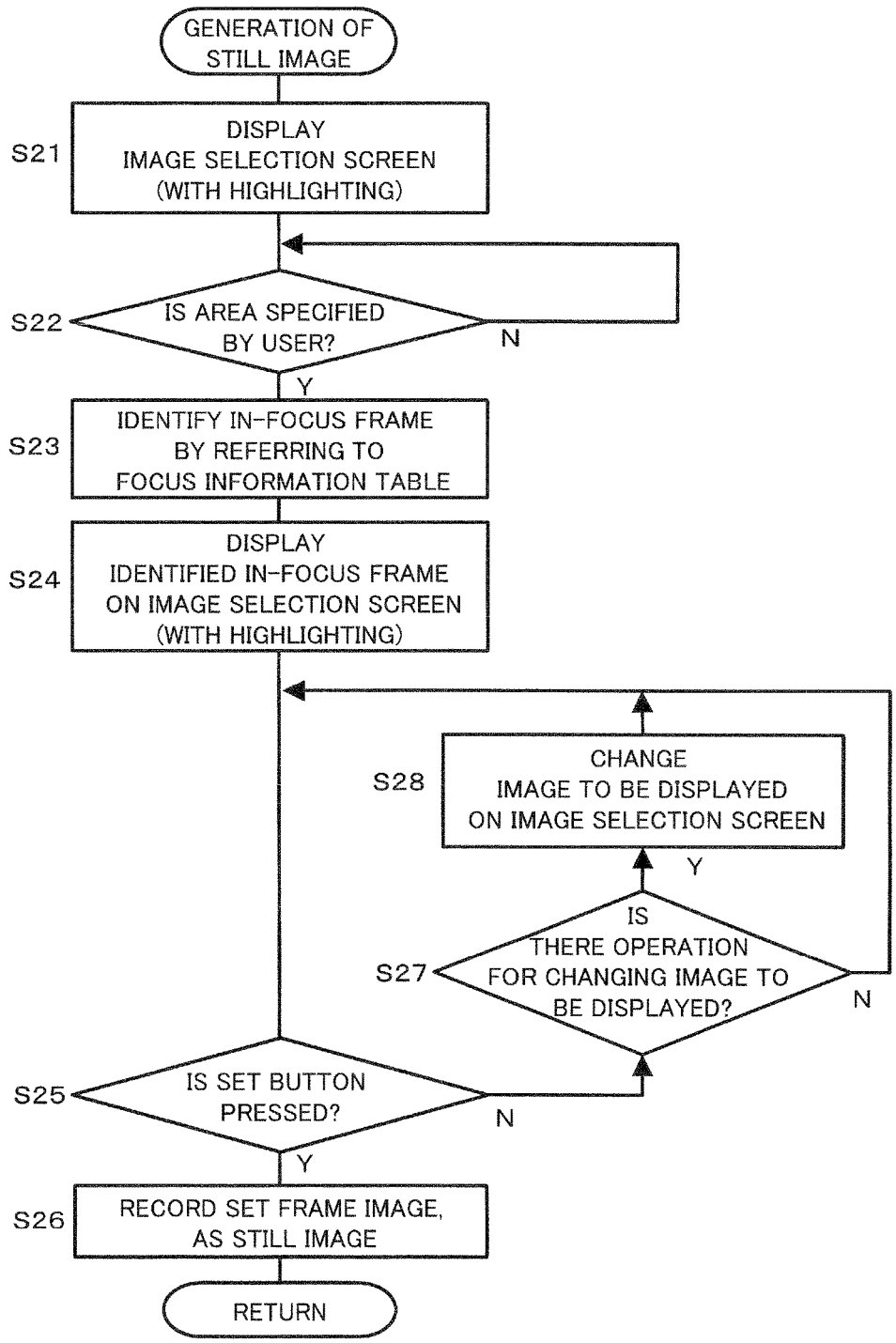
FIG. 8 is a flowchart showing processing of generating a still image from moving image data.

The still image generation operation (step S17) will be described with reference to a flowchart in FIG. 8. In the still image generation operation, a still image focused on a subject (a region) specified by the user is generated from a moving image recorded by the image shooting operation.

After the completion of the image shooting operation, the controller 180 displays on the display monitor 220 a screen for selecting, by a user, one image from among a plurality of frame images (hereinafter, referred to as an "image selection screen") (S21).

The image selection screen is a screen for the user to specify a still image which is desired to be extracted from the moving image data, after the completion of the image shooting operation. On the image selection screen, there is displayed an image for the user to specify a desired focus area by a touch operation or by an operation of the selection buttons 213 (hereinafter, referred to as a "still image selection image"). As a still image selection image, one of a plurality of frame images composing a moving image recorded by the image shooting operation is displayed on the display monitor 220.

Figure 9B:
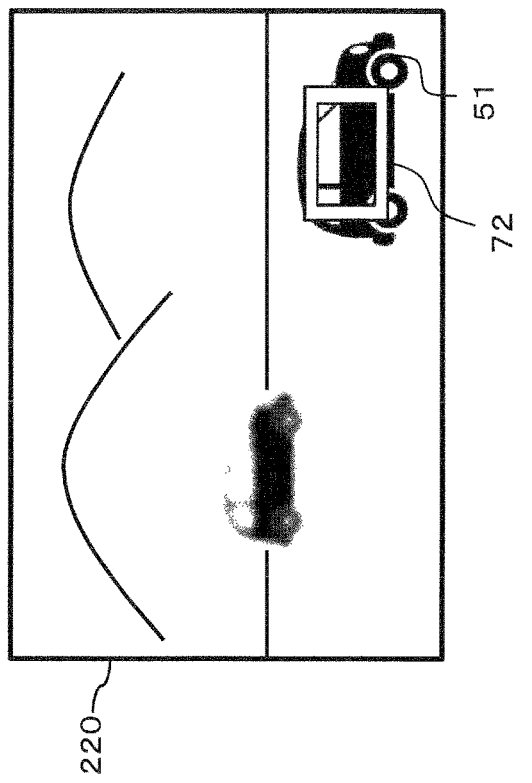
FIGS. 9A and 9B are views showing an example of highlighting of an image selection screen displayed after moving image data recording.
Figure 9A:
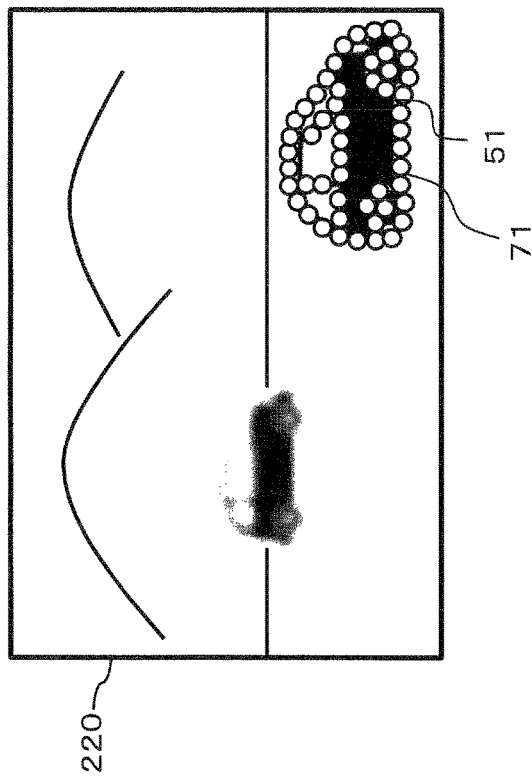

FIG. 9A is a view showing a display example of an image selection screen. A frame image to be first displayed as a still image selection image is an image that meets a predetermined condition among a plurality of frame images composing a moving image recorded by the image shooting operation. For example, it may be a frame image that is focused on a center region of an image. Alternatively, a frame image having a focus position closest to the nearest end among all the frame images may be selected as a still image selection image to be first displayed. By referring to the focus information table 60, the controller 180 can specify a frame image focused on a center region of an image (an AF area) or a frame image having a focus position closest to the nearest end among all the frame images. By first displaying the frame image selected in this way as a still image selection image on the image selection screen, an unfocused image could not be presented to the user. Further, an image focused on a region where the user can easily take notice can be first presented. Therefore, user's convenience of searching a desired image can be improved. In the example shown in FIG. 9A, the subject (or area) 51 is in-focus.

In the still image selection image, an in-focus subject (or region) 51 is subjected to peaking display (focus peaking) 71, as shown in FIG. 9A. Specifically, under the control of the controller 180, the image processor 160 determines a contrast value of YC data of a frame image, and regulates a parameter of color difference for a pixel having a contrast value larger than a predetermined value. Hence, an outline of the image including the target pixels is highlighted. Such highlighting of an in-focus area added with the peaking display 71 enables the user to easily discriminate an in-focus state and an in-focus area of the image.

The highlighting is not limited to the peaking display 71 as shown in FIG. 9A. As shown in FIG. 9B, a frame 72 may be displayed at a position corresponding to the in-focus subject (or region) 51. Such display of the frame 72 also enables the user to easily discriminate a focus state and a focus area of the image. In this case, by referring to the focus information table 60, the controller 180 specifies an in-focus AF area in the displayed frame image, and displays the frame 72 superimposed on the frame image at a position corresponding to the specified AF area.

Figure 10B:
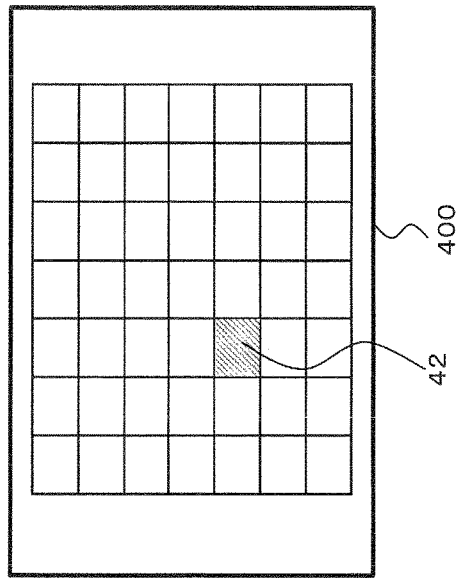
FIGS. 10A to 10O are explanatory views of operations by the user of specifying a desired focus area.
Figure 10A:
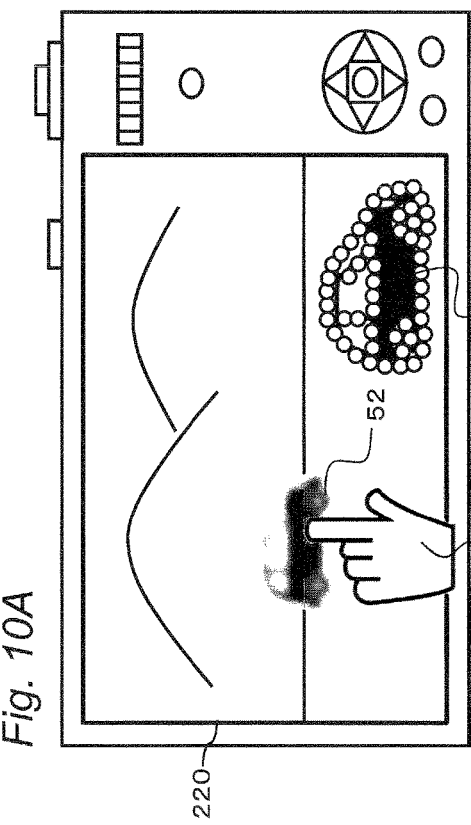

When the image selection screen is displayed (S21) in the manner as described above, the user specifies a subject (that is, a region) on the displayed still image selection image, which the user wishes to focus on, by operating the touch panel 222 provided on the camera back surface. For example, when a still image selection image is displayed as shown in FIG. 10A, the user 50 can specify the subject 52 as a target (a region) which is desired to be focused, by touching the subject 52. In FIG. 10A, the subject 51 is in-focus, and thus the peaking display (highlighting) is added to the subject 51.

Referring back to FIG. 8, when a subject (that is, a region) is specified by the user (YES in S22), the controller 180 specifies, by referring to the focus information table 60, an in-focus frame for the AF area corresponding to the region specified by the user (S23). For example, when the subject 52 is specified by the user as shown in FIG. 10A, the controller 180 specifies an AF area 42 corresponding to the touched subject 52 as shown in FIG. 10B, and specifies a frame number of an in-focus frame for the AF area 42 by referring to the focus information table 60.

Figure 10C:
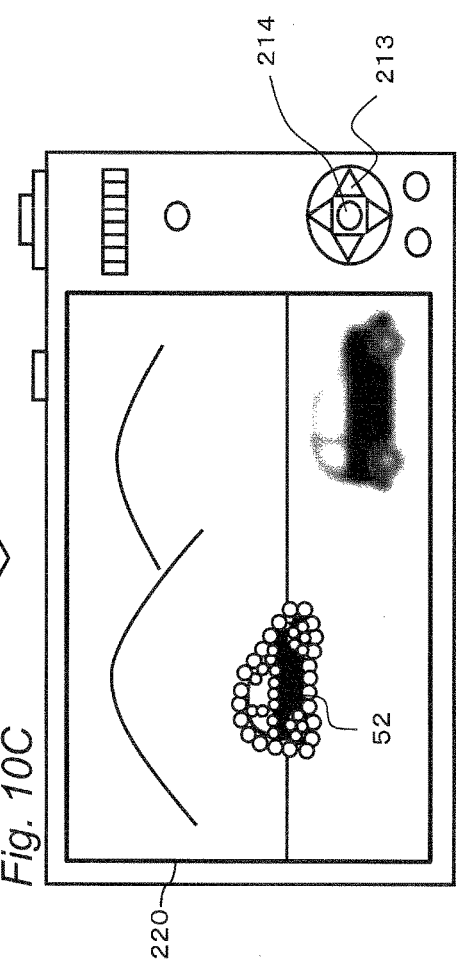

Then, the controller 180 displays a frame image of the specified frame number, as a new still image selection image (S24). For example, when the subject 52 is specified by the user 50 in the still image selection image shown in FIG. 10A, an image which is focused on the specified subject 52 is displayed as a new still image selection image, as shown in FIG. 10C. In the new still image selection image, the in-focus subject 52 (a subject of a high contrast value) is subjected to peaking display (highlighting) as shown in FIG. 10C. This peaking display enables the user to easily discriminate a focus state and a focus area of the image.

When the still image selection image displayed on the display monitor 220 is a desired image, the user can set this still image selection image as a still image to be recorded, by pressing the SET button 214 (S25). On the other hand, when the still image selection image displayed on the display monitor 220 is not the desired image, the user can change a still image selection image to be displayed on the image selection screen, by operating the selection buttons 213 or the focus ring (S27).

When the user performs the operation for changing a still image selection image (YES in S27), the controller 180 changes the still image selection image displayed on the image selection screen according to a user operation (S28). That is, after user's specifying of a region to be focused on, when the still image selection image displayed on the display monitor 220 is not an image desired by the user, the user can change an image to be displayed on the display monitor 220 by an operation of the selection buttons 213 and a rotation operation of the focus ring. For example, by performing a clockwise rotation of the focus ring, a display image can be changed to an image of a preceding or succeeding frame, that is, frame feeding becomes possible. By such a user operation, a still image selection image can be changed. Peaking display processing is also applied to the changed image.

When the SET button 214 is pressed by the user (YES in S25), the still image selection image (a frame image) which is being displayed is extracted as a still image, and is recorded in the memory card 200 (S26). For example, when the SET button 214 is pressed, a confirmation message to the user is displayed on the display monitor 220. When a user instruction ("Yes") is input to the confirmation message, the controller 180 extracts data of a frame image which is being displayed from moving image data, and records the extracted data in the memory card 200 as a still image. Still image data may be recorded in the internal memory 240 or other recording medium, in place of or in addition to the memory card 200.

The moving image data is recorded by a moving image codec (H.264 or H.265), and is applied with intra-frame compression. Therefore, in obtaining a still image by extracting a frame of the moving image data, the controller 180 converts a format of data of a frame image into a format for a still image (for example, JPEG), and records it.

In the manner as described above, still image data which is focused on the region specified by the user can be extracted from moving image data. That is, the user can obtain the image focused on the desired subject.

Particularly, according to the present embodiment, in the image displayed on the image selection screen which is the screen for specifying a still image to be extracted from moving image data, an in-focus area (a region of a contrast value larger than a predetermined value is defined as an in-focus area) is subjected to highlighting. Based on the highlighting of an in-focus area performed as mentioned above, the user can easily understand a focus state and a focus area of the image, and can easily select a desired image.

Further, according to the present embodiment, as a still image selection image which is first displayed on the image selection screen, a frame image focused on the center region in an image or a frame image having a focus position closest to the nearest end among all the frame images is selected. Accordingly, an unfocused image is not presented to the user. Further, an image focused on a region that the user can easily take notice can be first presented. Therefore, user's convenience of searching a desired image can be improved.

3. Effects and Others

The digital camera 100 (an example of an imaging apparatus) according to the present embodiment includes the optical system 110, the CCD 140 (an example of an imaging unit) that generates an image signal by capturing a subject image input via the optical system 110, the image processor 160 that applies predetermined processing on the image signal generated by the CCD 140 to generate image data, the display monitor 220 (an example of a display unit) that displays an image indicated by the image data, and the controller 180 (an example of a control unit) that controls the image processor 160 and the display monitor 220. The controller 180 records moving image data, and generates, from all or a part of a plurality of frame images composing the recorded moving image data, a still image (for example, a frame image having an in-focus area in a region specified by the user) based on specification of an image or an image region made by the user. The display monitor 220 displays one frame image among a plurality of frame images composing the recorded moving image data, as a still image selection image (an example of a setting image) for the user to assign an image or a region of an image, and applies highlighting on an in-focus portion in the still image selection image.

Based on the highlighting of an in-focus portion (a region of a high contrast value) performed in the image as mentioned above, the user can easily understand a focus state and a focus area of the image, and can easily select a desired image.

Further, a frame image having a focus area in the center of an image region or a frame image having a focus position closest to the nearest end side may be selected as a still image selection image in a plurality of frame images composing the recorded moving image data. Accordingly, an unfocused image is not presented to the user, and further, an image focused on a region that the user can easily take notice can be first presented. Therefore, user's convenience of searching a desired image can be improved.

Other Embodiments

The first embodiment is described above as exemplification of a technique disclosed in the present application. However, the technique in the present disclosure is not limited to the first embodiment, and can be also applied to any embodiments in which change, replacement, addition, and omission are appropriately performed. Further, a new embodiment can be also provided by combining constituent elements described in the first embodiment. Other embodiments will be exemplified below.

(1) The functions (highlighting, and selection of a first still image selection image) concerning the image selection screen described in the above embodiment can be also applied to a function other than the focus selection function. For example, the digital camera disclosed in Japanese Patent Publication No. 5866674 has a second moving image mode of shooting a moving image suitable for still image generation, in addition to an ordinary moving image mode. In the second moving image mode, high image-quality (4K) moving image data is recorded. Thereafter, one frame image specified by the user is extracted from among a plurality of frame images composing the moving image data recorded in the second moving image mode to generate a still image (refer to FIG. 11).

Figure 12:
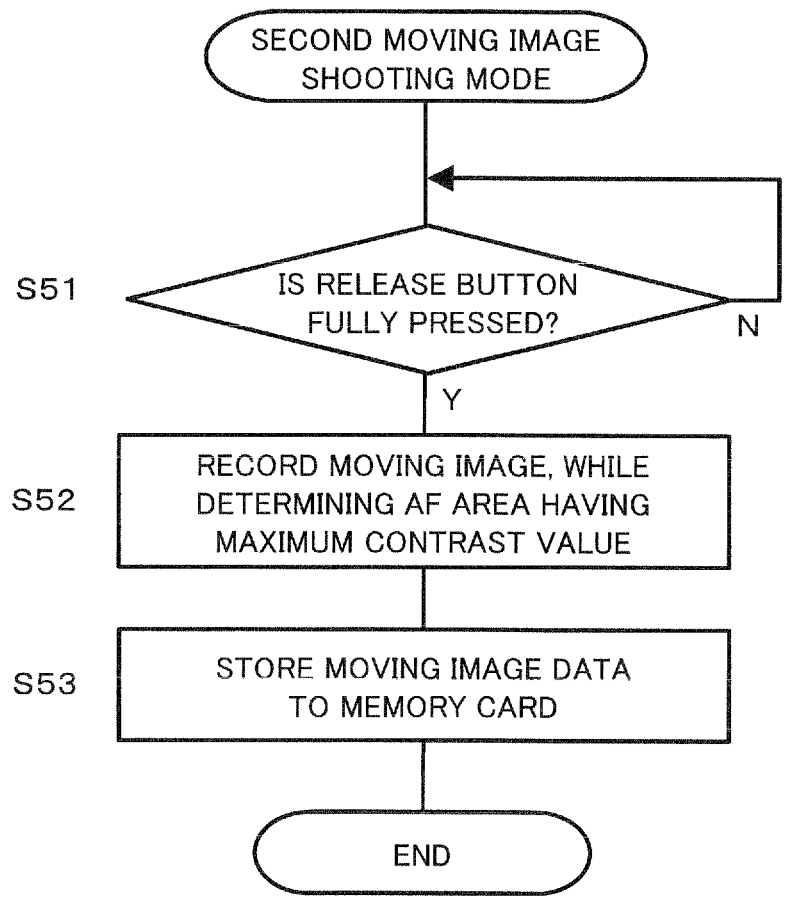
FIG. 12 is a flowchart showing processing in a second moving image mode.
Figure 13:
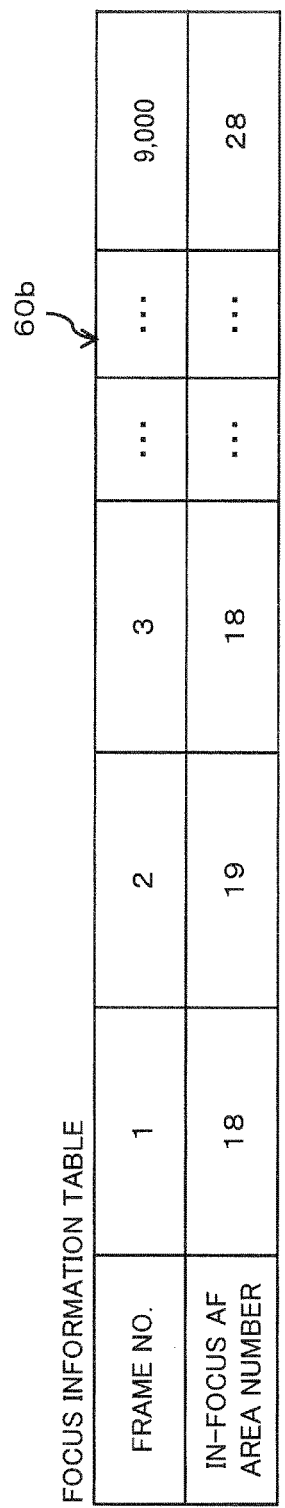
FIG. 13 is a view showing an example of a focus information table generated in the second moving image mode.

FIG. 12 is a flowchart showing the processing in the second moving image mode. When the release button 211 is fully pressed by the user (YES in S51), recording of a moving image for still image generation is started. That is, the controller 180 performs moving image recording while performing focusing (S52). In this case, during the moving image recording, the controller 180 detects a contrast value for each AF frame region in each frame image, detects an AF frame region having the largest contrast value, and generates a focus information table based on a detection result. FIG. 13 shows an example of a focus information table generated in the second moving image mode. The focus information table 60b manages a frame number of each frame and a number of an AF frame having the largest contrast value in the frame image corresponding to the frame number in relation to each other. Thereafter, after completion of recording of the moving image data, the controller 180 records the moving image data into the memory card 200 (S53).

Thereafter, one frame image specified by the user is extracted from among a plurality of frame images composing the moving image data which is recorded as described above. For example, a still image is extracted following the processing described in the flowchart shown in FIG. 8. In the processing of FIG. 8, the frame image focused on the AF area corresponding to the region specified by the user is extracted as the still image. Instead, a frame image specified by the user may be extracted as the still image.

In the digital camera having such a function, the highlighting (peaking display, and frame display) described in the above embodiment can be also applied to the still image selection image (one of plural frame images composing the moving image data) which is displayed on the selection screen on which the user assigns a desired image. Further, the still image selection image which is first displayed on the selection screen used for the user to specify an image may be a frame image that has a focus area in the center or may be a frame image that has a focus area having a focus lens position at the shooting closest to the nearest end in all the frame images.

(2) In the above embodiment, highlighting such as peaking display and frame display is applied on a focus area (a region of a high contrast value). However, highlighting is not limited to that way. Frame display and peaking display may be performed simultaneously. Accordingly, even when a plurality of subjects exist inside the frame, for example, it is possible to confirm which subject is focused. Any highlighting may be applied by other methods as long as they allow the user to visually recognize an in-focus area (a region of a high contrast value) in the image.

(3) While a still image is displayed as a still image selection image on the image selection screen described in the above embodiment, a moving image may be displayed. In this case, during playback of a moving image, highlighting (peaking display, or frame display) may be applied on an in-focus area (a region of a high contrast value) in each frame image of the moving image. Hence, the user can easily understand an in-focus area, and can quickly access a desired image. Highlighting of an in-focus area in a currently displayed frame and highlighting of an in-focus area in a few frames around the currently displayed frame may be superposed with each other. A highlighting method of a currently displayed frame may be made different from that of frames around the currently displayed frame by changing frame colors, for example. Accordingly, even when an in-focus area changes in adjacent frames, the user can easily understand an in-focus area, and can quickly access a desired image. Such processing of superimposing highlighting of an in-focus area in the plurality of frames can be also applied to highlighting in a live view image during the moving image recording or during the focus search.

(4) The highlighting display described in the above embodiment can be also applied to specifying a range (a region) of a subject which is desired to be focused in a depth synthesizing (focus synthesizing) function. Depth synthesizing (focus synthesizing) processing is processing of generating a still image having an apparently deep depth of field by synthesizing images recorded at a plurality of different focus positions. In order to perform the depth synthesizing processing, it is necessary to generate in advance data of a plurality of still images (or data of a plurality of frame images composing a moving image) and a focus information table for managing a focus position in each of a plurality of divided regions (AF areas) in each still image. For example, a plurality of still image data (moving image data) and the focus information tables 60 and 60b may be generated according to the flowcharts in FIG. 1 and FIG. 12.

Figure 14B:
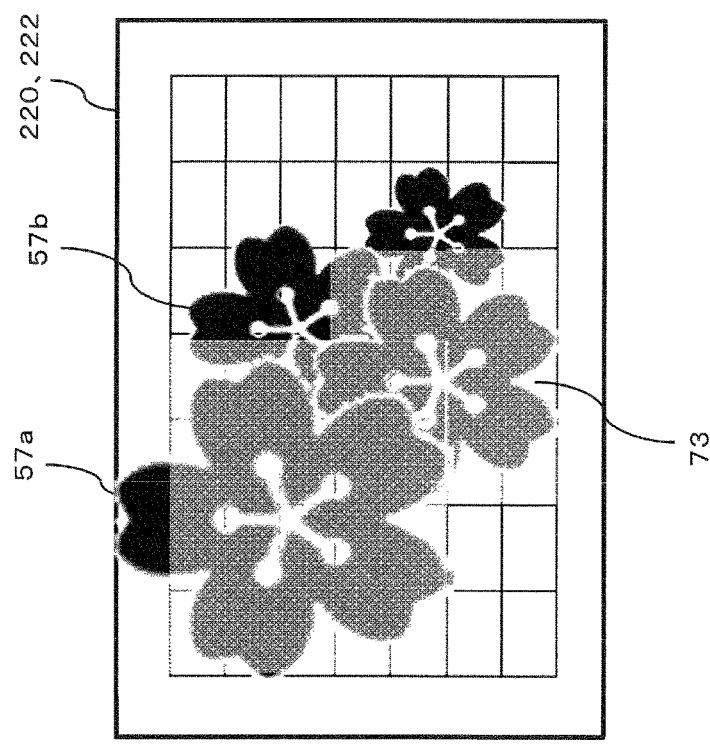
FIGS. 14A and 14B are views showing an example of adding highlighting to a region to be focused in a screen for assigning a focus range in depth synthesizing processing.
Figure 14A:
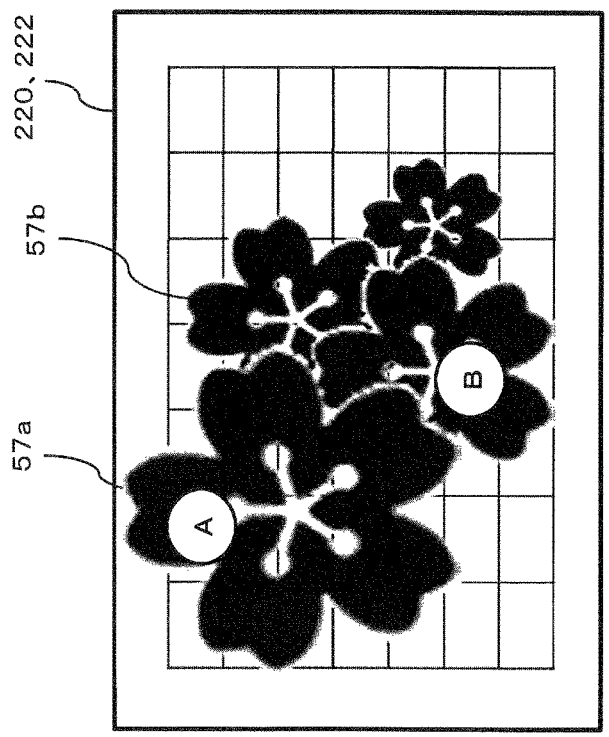

FIG. 14A is a view showing an example of a setting image for the user to specify a range (a region) of a subject which is desired to be focused in the depth synthesizing. The user can specify a range of a subject which is desired to be focused by specifying two areas by a touch operation on the setting image. For example, in the example shown in FIG. 14A, an area A and an area B are specified by the user, as a range of the subject which is desired to be focused. In this case, in the depth synthesizing processing, the controller 180 extracts, by referring to the focus information table 60 or 60b, still images (frame images) each having an AF area having a focus position between a focus position (hereinafter, a "focus position A") for an AF area corresponding to the area A and a focus position (hereinafter, a "focus position B") for an AF area corresponding to the area B. Then, the controller 180 synthesizes the extracted still images (frame images) to generate one still image. In this case, as shown in FIG. 14B, for the highlighting for indicating a depth synthesizing range, the controller 180 adds highlighting 73 to an image area corresponding to the AF area including the touched region A, an image area corresponding to the AF area including the touched region B, and an image area corresponding to the AF area having a focus position between the focus position A and the focus position B, on the setting image.

Figure 15:
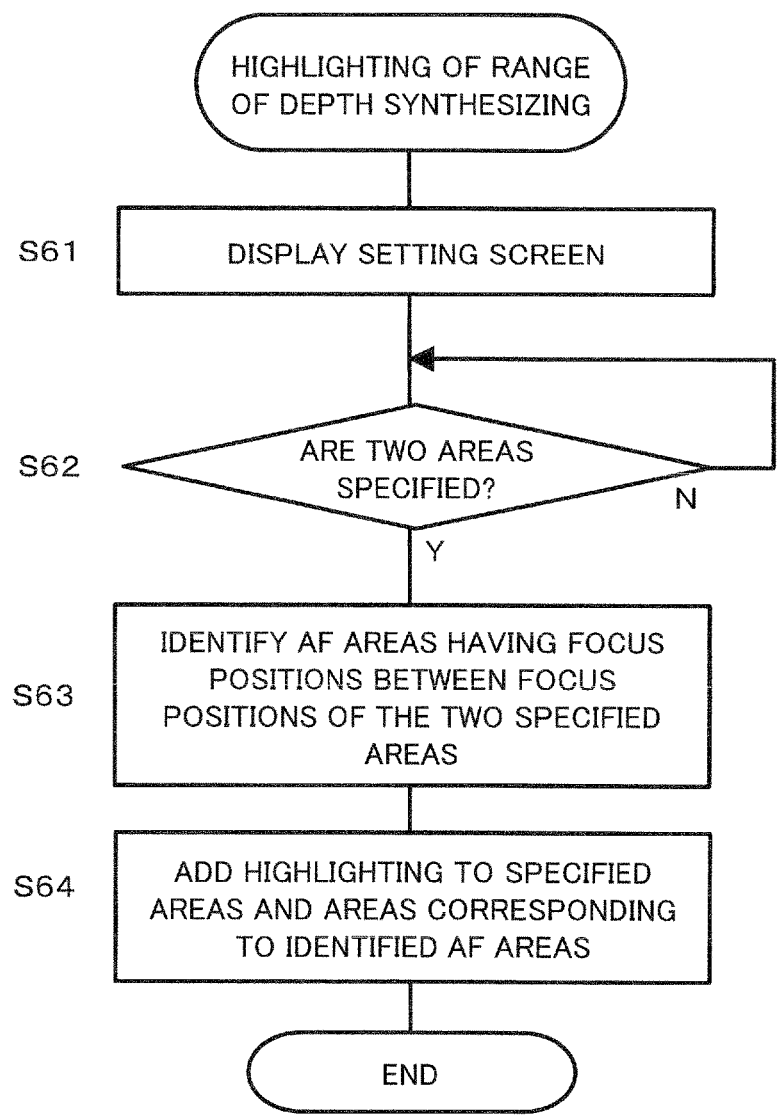
FIG. 15 is a flowchart showing highlighting processing of a depth synthesizing range.

FIG. 15 is a flowchart showing highlighting processing for a depth synthesizing range. The controller 180 displays a setting screen (for example, FIG. 14A) for the user to specify a range (an area) of a subject which is desired to be focused in the depth synthesizing processing (S61). The setting screen includes either one of a plurality of still images (a plurality of frame images composing a moving image) which were recorded in advance. When a range of depth synthesizing is specified on the setting screen based on the user's assignment of two regions (S62), the controller 180 identifies, by referring to the focus information table 60 or 60b, AF areas each having a focus position between the respective focus positions corresponding to the two specified regions (S63). Then, the controller 180 adds highlighting to areas corresponding to the specified areas A and B, and areas corresponding to the identified AF areas (S64). FIG. 14B is a view showing an example of a setting screen which is added with highlighting in the manner as described above. In FIG. 14B, the areas corresponding to the specified areas A and B, and the areas corresponding to the specified AF areas are subjected to the highlighting 73. By referring to the screen added with such highlighting, the user can easily confirm a region of a subject to be synthesized in the depth synthesizing processing. When the two areas are specified the depth synthesizing may be performed and highlighting may be added on the synthesized still image. Hence, the user can redo the work while confirming both the synthesized image and the focus area, until an intended synthesized image is obtained. In FIG. 14B, highlighting is achieved by changing brightness of the AF areas. Alternatively, for highlighting, the peaking display 71 or the frame display 72 may be provided, as shown in FIGS. 9A and 9B.

(5) The idea disclosed in the above embodiment can be applied to both kinds of digital cameras of an interchangeable lens camera and a lens-integrated type camera.

(6) The above embodiment is described by using a digital camera as an example of the imaging apparatus. However, the imaging apparatus is not limited to a digital camera. The idea of the present disclosure can be applied to various kinds of imaging apparatuses that can perform shooting of a moving image, such as a digital video camera, a smartphone, and a wearable camera.

(7) In the above embodiment, although the imaging device is a CCD, the imaging device is not limited to this. The imaging device may also be an NMOS image sensor or a CMOS image sensor.

What is claimed is:

1. An imaging apparatus comprising:
an optical system;
an imaging unit that captures a subject image which is input via the optical system and generates an image signal;
an image processor that performs predetermined processing on the image signal generated by the imaging unit and generates moving image data;
a display unit that displays an image represented by the moving image data; and
a control unit that controls the image processor and the display unit, wherein
the control unit records the moving image data and in a recording medium, and
after completion of recording the moving image data, the control unit generates a still image from the recorded moving image data by selecting one of all or a part of a plurality of frame images composing the recorded moving image data based on an image specified by a user on a setting image or an area of the image specified by the user on the setting image, and
the display unit displays one of the plurality of frame images as the setting image, the setting image provided for the user to specify a frame image which is to be selected or a region, of the setting image, which is desired to be focused, and adds highlighting to an in-focus portion in the setting image.

2. The imaging apparatus according to claim 1, wherein the optical system has a focus lens, and the control unit records the moving image data while moving the focus lens in one direction.

3. The imaging apparatus according to claim 1, wherein, as the highlighting, the display unit adds highlighting to an edge portion of a region including the in-focus portion in the setting image.

4. The imaging apparatus according to claim 1, wherein, as the highlighting, the display unit displays a predetermined frame at a position corresponding to the in-focus portion in the setting image.

5. The imaging apparatus according to claim 1, wherein during recording, by the control unit, of the moving image data, the display unit also displays one frame image from among the plurality of frame images composing the moving image data under recording, and adds highlighting to an in-focus portion in the displayed one frame image.

6. The imaging apparatus according to claim 1, wherein the setting image is a frame image having a focus area in a center of an image region in the plurality of frame images composing the recorded moving image data.

7. The imaging apparatus according to claim 1, wherein the setting image is a frame image having a focus area on a nearest end side in the plurality of frame images configuring the recorded moving image data.

8. The imaging apparatus according to claim 1, wherein the control unit selects, as the still image, a frame image focused on the region specified by the user, from among the plurality of frame images composing the recorded moving image data.

9. The imaging apparatus according to claim 1, wherein the control unit selects, as the still image, one frame image specified by the user, from among the plurality of frame images composing the recorded moving image data.

* * * * *